(12) United States Patent
Tan et al.

(10) Patent No.: US 8,629,689 B1
(45) Date of Patent: Jan. 14, 2014

(54) INTEGRATED CIRCUIT WITH IMPROVED INTERCONNECT ROUTING AND ASSOCIATED METHODS

(75) Inventors: Jun Pin Tan, Selangor (MY); Kiun Kiet Jong, Pulau Pinang (MY)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/475,927

(22) Filed: May 18, 2012

(51) Int. Cl.
*H03K 19/173* (2006.01)

(52) U.S. Cl.
USPC .................................. 326/38; 326/41; 326/47

(58) Field of Classification Search
USPC ................................. 326/38–41, 47
See application file for complete search history.

(56) References Cited

U.S. PATENT DOCUMENTS

| | | | | |
|---|---|---|---|---|
| 5,404,485 | A * | 4/1995 | Ban | 711/202 |
| 7,012,448 | B2 * | 3/2006 | Parkes | 326/41 |
| 7,388,781 | B2 * | 6/2008 | Litsyn et al. | 365/185.09 |

* cited by examiner

*Primary Examiner* — Daniel D Chang
(74) *Attorney, Agent, or Firm* — Law Offices of Maximilian R. Peterson (57) ABSTRACT

An integrated circuit (IC) includes a circuit, an encoder, and a decoder. The circuit is coupled to circuitry in the IC via a first set of interconnect fabricated using a metal layer. The encoder encodes a plurality of address lines to provide a plurality of encoded address lines. The decoder decodes the plurality of address lines. The plurality of encoded address lines are routed using a second set of interconnect fabricated using the metal layer.

20 Claims, 8 Drawing Sheets

INTEGRATED CIRCUIT WITH IMPROVED INTERCONNECT ROUTING AND ASSOCIATED METHODS

TECHNICAL FIELD

The disclosed concepts relate generally to integrated circuits (ICs), such as programmable logic devices (PLDs). More particularly, the disclosed concepts concern improved interconnect routing in ICs, for example, PLDs.

BACKGROUND

Levels of integration in electronics have continued to increase because of advances in circuit design and fabrication. The technology for fabrication of ICs has provided a vehicle for integrating a relatively large number of circuits and functions into an IC. As a result, present-day ICs might contain hundreds of millions of transistors. To provide a mechanism for coupling the various transistors and circuits, ICs include a variety of interconnect, such as metal layers, metal traces, etc. The increase in the number of transistors has led to the increase in the number of metal layers and interconnects.

SUMMARY

A variety of apparatus and related techniques for electronic circuitry, such as ICs, with improved interconnect structures and improved interconnect routing are contemplated within the scope of the disclosure. In one exemplary embodiment, an IC includes a circuit that is coupled to circuitry in the IC via a first set of interconnect fabricated using a metal layer, and an encoder to encode a plurality of address lines to provide a plurality of encoded address lines. The IC further includes a decoder to decode the plurality of encoded address lines, wherein the plurality of encoded address lines are routed using a second set of interconnect fabricated using the metal layer.

In another exemplary embodiment, a PLD includes a circuit implemented using programmable resources of the PLD, and an encoder to encode a plurality of address lines to provide a plurality of encoded address lines. The plurality of encoded address lines being routed using a first set of interconnect fabricated above the circuit. The PLD also includes a decoder to decode the plurality of encoded address lines.

In another exemplary embodiment, a method of improving interconnect routing in an IC includes encoding a plurality of address lines to produce a plurality of encoded address lines, and routing the plurality of encoded address lines via a first set of interconnects fabricated in the IC. The circuit is coupled to other circuitry in the IC via a second set of interconnects fabricated in IC. Routing the plurality of encoded address lines via the first set of interconnects reduces routing congestion in the IC.

BRIEF DESCRIPTION OF THE DRAWINGS

The appended drawings illustrate only exemplary embodiments and therefore should not be considered as limiting its scope. Persons of ordinary skill in the art appreciate that the disclosed concepts lend themselves to other equally effective embodiments. In the drawings, the same numeral designators used in more than one drawing denote the same, similar, or equivalent functionality, components, or blocks.

DETAILED DESCRIPTION

The disclosed concepts provide apparatus and related techniques for electronic circuitry, such as ICs, with improved interconnect structures and improved interconnect routing. The disclosed apparatus and techniques can be used in a variety of configurations, and can provide efficient interconnect routing and less interconnect congestion in ICs.

Figure 1:
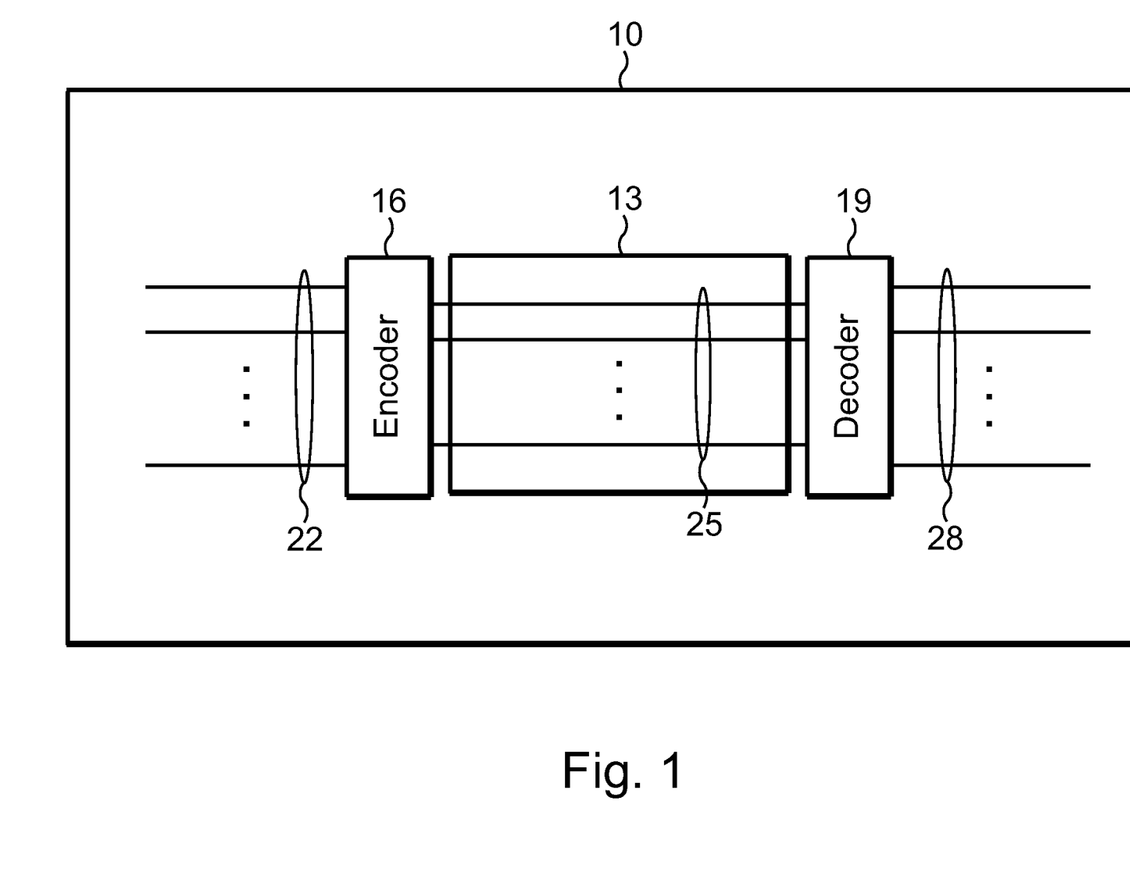
FIG. 1 illustrates a circuit arrangement for improving interconnect congestion according to an exemplary embodiment.

FIG. 1 illustrates a circuit arrangement for improving interconnect congestion according to an exemplary embodiment. Specifically, the arrangement includes an IC 10. IC 10 includes a circuit 13, which may include or constitute a variety of circuitry. For example, in some embodiments, circuit 13 may be an analog circuit, a digital circuit, or a mixed-signal circuit. In some embodiments, circuit 13 may be a hardened circuit, implemented or realized using devices in IC 10. In some embodiments, circuit 13 may an intellectual property (IP) block, such as a processor, a memory, a transceiver, a digital signal processor, an audio or video processor or controller, etc. In some embodiments, circuit 13 may be a hardened IP circuit or block although, generally speaking, circuit 13 need not be hardened.

Circuit 13 is coupled to other circuitry (not shown in FIG. 1) in IC 10 using a set of interconnect (not shown). The interconnect may include metal or polysilicon or semiconductor traces, vias, through silicon vias (TSVs), contacts, and the like. The interconnect may be implemented, at least in part, by using a metal layer (e.g., fabricated by patterning or etching the metal layer). In some embodiments, the metal layer may reside or be fabricated above circuit 13. In some embodiments, the metal layer may reside or be fabricated below circuit 13. In some embodiments, more than one metal layer may be used, where the interconnect is fabricated at least in part using two or more metal layers.

IC 10 also includes a plurality of address lines 22. Address lines 22 may couple to a variety of circuitry. For example, address lines 22 may couple to memory circuits (not shown) in IC 10 in order to facilitate various locations in the memory circuits for read or write operations. As another example, address lines 22 may couple to registers to facilitate addressing specific locations. In some embodiments, address lines 22 are fabricated using, or implemented in, at least in part, the same metal layer used for the interconnects that couple circuit 13 to other circuitry in IC 10.

Address lines 22 are coupled to encoder 16. Encoder 16 encodes address lines 22 or, stated differently, encodes address information provided by address lines 22, to generate encoded address lines 25. In some embodiments, encoded address lines 25 are routed above (or below) circuit 13, e.g., they are fabricated using, or implemented in, at least in part, the same metal layer used for the interconnects that couple circuit 13 to other circuitry in IC 10. Encoded address lines may be considered feed-through address lines that are routed through the space that is used, at least in part, by the interconnects that couple circuit 13 to other circuitry in IC 10.

Thus, if encoded address lines 25 use a relatively large number of segments, traces, lines, or interconnects in the metal layer, interconnect congestion may result. More specifically, the interconnect resources that may be fabricated using the metal layer would be divided between address lines 25 and the interconnects used to couple circuit 13 to various other circuits. If the number of address lines 25 is relatively large, routing congestion in the metal layer or in the interconnects that couple circuit 13 to other circuitry in IC 10 may result. Generally, routing congestion in the IC may result or may increase.

By virtue of the encoding provided by encoder 16, the number of encoded address lines 25 is fewer than the number of address lines 22. For example, if address lines 22 include N address lines, encoded address lines 25 may include M address lines, where N and M are positive integers, and where N>M.

The reduction in the number of address lines because of the encoding, i.e., the number of encoded address lines 25 being fewer than the number of address lines 22, reduces, or tends to reduce, routing congestion in IC 25. More specifically, using encoder 16 to produce encoded address lines 25 reduces routing congestion in the metal layer and/or in the interconnects that couple circuit 13 to other circuitry in IC 10.

IC 10 also includes decoder 19. Decoder 19 receives encoded address lines 25, and decodes them to provide decoded address lines 28. Decoded address lines 28 may be provided to a variety of circuits, such as memory circuits.

By virtue of the encoding by encoder 16 and decoding by decoder 19, decoded address lines 28 include or carry the same address information as do address lines 22. The use of encoder 16 and decoder 19 allows the provision of the address information, while reducing routing or routing interconnect congestion, as described above.

Figure 2:
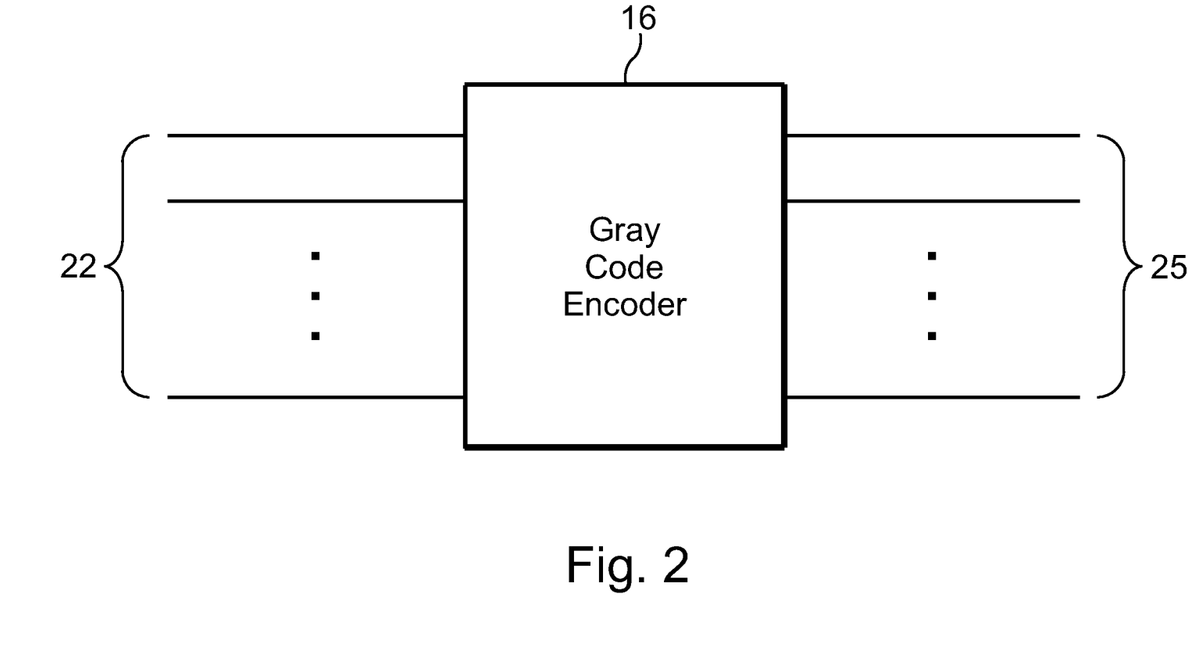
FIG. 2 depicts an encoder for encoding address information according to another exemplary embodiment.

FIG. 2 depicts an encoder 16 for encoding address information according to another exemplary embodiment. In the embodiment shown, encoder 16 is a gray code encoder. As persons of ordinary skill in the art understand, in subsequent values encoded using a gray code, one bit changes. This property helps to avoid race conditions that might occur because the encoding/decoding operation is asynchronous. Using gray coding also may also help to reduce interference and crosstalk among encoded address lines 25. In other words, reducing the number of signal level changes between consecutive address values represented by encoded address lines 25 may lower interference and crosstalk among encoded address lines 25.

As noted above, using address encoding and decoding allows increasing interconnect density and reduces interconnect congestion in IC 10. The reduction of interference and crosstalk also helps designers to use smaller spacing between the metal traces or interconnects used to fabricate or implement encoded address lines 25. The smaller feature sizes of encoded address lines 25 also helps to reduce interconnect congestion in IC 10.

Figure 3:
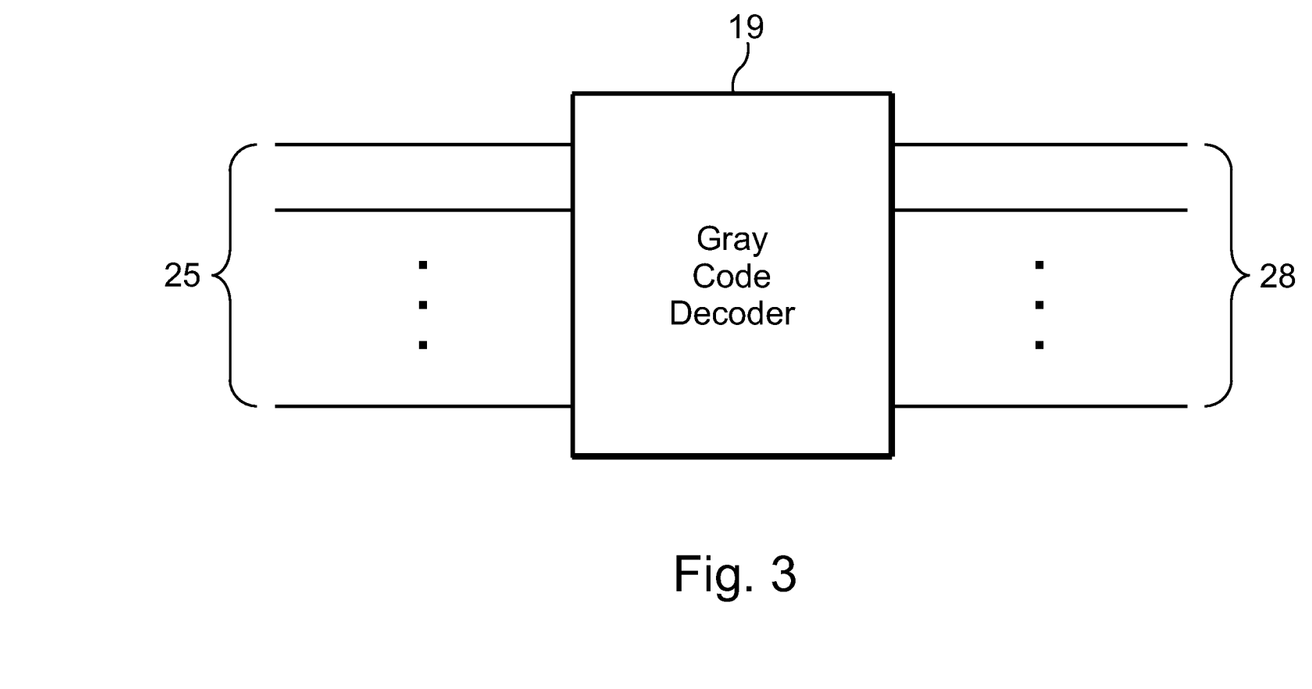
FIG. 3 shows a decoder for decoding address information according to another exemplary embodiment.

FIG. 3 shows a decoder 19 for decoding address information according to another exemplary embodiment. In the embodiment shown, decoder 19 is a gray code decoder. Decoder 19 operates in conjunction with decoder 16 of FIG. 2. Thus, in the embodiment shown in FIG. 3, decoder 19 decodes gray-coded address lines 25 to produces the same address information as provided to encoder 16 (see FIG. 2).

The congestion reduction techniques described above may be used in a variety of ICs. For example, in some embodiments, the IC may include PLD circuitry. As persons of ordinary skill in the art understand, PLDs typically use a configuration memory that couples to programmable resources of the PLD to program or configure their functionality (e.g., when implementing a user's circuit via the programmable resources of the PLD). Using the disclosed apparatus and techniques allows reducing the congestion that may otherwise result from the address lines used with the PLD's configuration memory.

Figure 4:
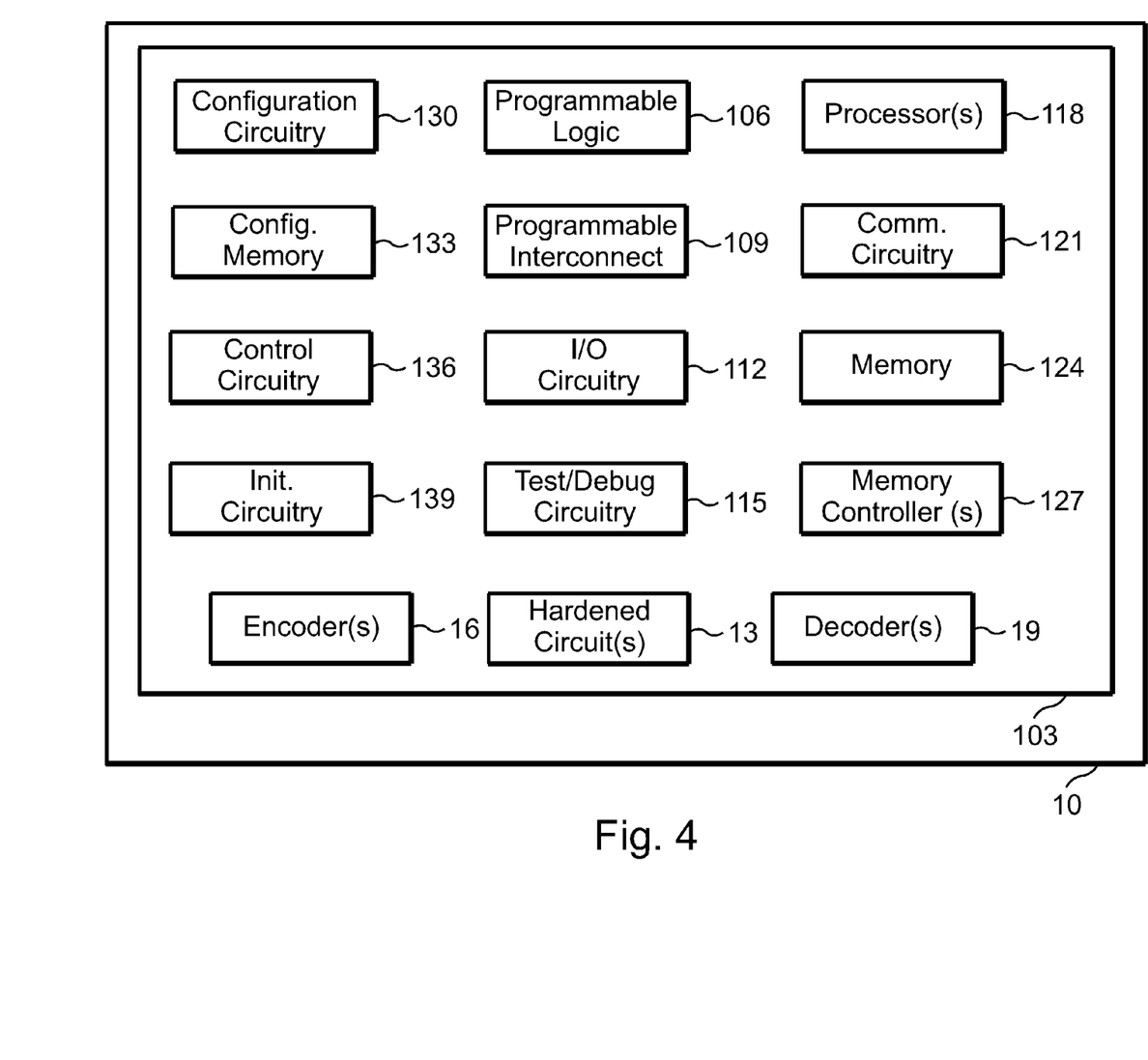
FIG. 4 illustrates a general block diagram of a programmable logic device (PLD) that includes address encoding and decoding circuitry according to an exemplary embodiment.

FIG. 4 illustrates a general block diagram of a programmable logic device (PLD) 103 that includes address encoding and decoding circuitry according to an exemplary embodiment. PLD 103 includes configuration circuitry 130, configuration memory (CRAM) 133, control circuitry 136, programmable logic 106, programmable interconnect 109, and I/O circuitry 112. In addition, PLD 103 may include test/debug circuitry 115, one or more processors 118, one or more communication circuitry 121, one or more memories 124, one or more controllers 127, and initialization circuit 139, as desired.

Note that PLD 103 may include other blocks and circuitry, as persons of ordinary skill in the art understand. Examples of such circuitry include clock generation and distribution circuits, redundancy circuits, and the like. Furthermore, PLD 103 may include analog circuitry, other digital circuitry, and/or mixed-signal circuitry, as desired.

Control circuitry 136 controls various operations within PLD 103. Under the supervision of control circuitry 136, PLD configuration circuitry 130 uses configuration data (which it may obtain from an external source, such as a storage device, a host, etc.) to program or configure the functionality of PLD 103. Configuration data are typically stored in CRAM 133. The contents of CRAM 133 determine the functionality of various blocks of PLD 103, such as programmable logic 106 and programmable interconnect 109. Initialization circuit 139 may cause the performance of various functions at reset or power-up of PLD 103.

I/O circuitry 112 may constitute a wide variety of I/O devices or circuits, as persons of ordinary skill in the art who have the benefit of the disclosure understand. I/O circuitry 112 may couple to various parts of PLD 103, for example, programmable logic 106 and programmable interconnect 109. I/O circuitry 112 provides a mechanism and circuitry for various blocks within PLD 103 to communicate with external circuitry or devices.

Test/debug circuitry 115 facilitates the testing and troubleshooting of various blocks and circuits within PLD 103. Test/debug circuitry 115 may include a variety of blocks or circuits known to persons of ordinary skill in the art who have the benefit of the disclosure. For example, test/debug circuitry 115 may include circuits for performing tests after PLD 103 powers up or resets, as desired. Test/debug circuitry 115 may also include coding and parity circuits, as desired.

PLD 103 may include one or more processors 118. Processor 118 may couple to other blocks and circuits within PLD 103. Processor 118 may receive data and information from circuits within or external to PLD 103 and process the information in a wide variety of ways, as persons skilled in the art with the benefit of the disclosure in this document appreciate. One or more of processor(s) 118 may constitute a digital signal processor (DSP). DSPs allow performing a wide variety of signal processing tasks, such as compression, decompression, audio processing, video processing, filtering, and the like, as desired.

PLD 103 may also include one or more communication circuits 121. Communication circuit(s) 121 may facilitate data and information exchange between various circuits within PLD 103 and circuits external to PLD 103, as persons of ordinary skill in the art understand. For example, in some embodiments, communication circuitry 121 may include transceivers for communicating with other electronic devices.

PLD 103 may further include one or more memories 124 and one or more memory controller(s) 127. Memory 124 allows the storage of various data and information (such as user-data, intermediate results, calculation results, etc.) within PLD 103. Memory 124 may have a granular or block form, as desired. Memory controller 127 allows interfacing to, and controlling the operation and various functions of memory 124 and/or memory external to PLD 103 and/or die 5 (e.g., memory integrated in another semiconductor die (not shown)). For example, controller 127 may constitute a memory controller that interfaces to and controls an external synchronous dynamic random access memory (SDRAM), as desired.

PLD 103 includes one or more hardened circuits 13, one or more encoders 16, and one or more decoders 19, which may be similar to, or the same as, corresponding blocks and circuitry described above in connection with FIGS. 1-3. Thus, in some embodiments, PLD 103 may include one or more circuits 13, some or all of which may be hardened. In other embodiments, PLD 103 may include one or more circuits 13 that are not hardened. The description in this disclosure may refer to hardened circuits 13, although the concepts described may be applied to a variety of embodiments, such as the foregoing embodiments (e.g., embodiments where one or more circuits 13 are not hardened, etc.), as persons of ordinary skill in the art understand. One or more of encoders 16 may be a gray code encoder, as described above. Correspondingly, one or more of decoders 19 may be a gray code decoder, as described above.

In some embodiments, hardened circuits 13 may be implemented using dedicated circuitry, whereas in some embodiments hardened circuits 13 may be implemented using the programmable resources (e.g., programmable interconnect 109, programmable logic 106) of PLD 103, and/or a combination of dedicated circuitry and programmable resources, as desired. In some embodiments, one or more of hardened circuits 13 may be an IP block or circuit, as described above. Some of the circuitry shown in PLD 103 may be included in, or may constitute, an IP block (e.g., be included in hardened circuit(s) 13). Examples include processor(s) 118, communication circuitry 121, memory 124, memory controller(s) 127, etc.

Hardened circuit(s) 13 may couple to a variety of PLD resources, such as the circuitry or blocks shown in FIG. 4. More specifically, hardened circuit(s) 13 may couple to programmable interconnect 109 of PLD 103 and, hence to other circuitry in PLD 103, such as programmable logic 106 or other circuitry shown in FIG. 4.

One may place the various blocks in FIG. 4 a particular manner so as to implement a user's design, as persons of ordinary skill in the art understand. A block, part of a block, or a set of blocks may constitute a tile or region of PLD 103. PLD 103 may thus include a number of tiles, arranged in a desired configuration (e.g., as two halves, four quadrants, etc.), as persons of ordinary skill in the art understand. In other embodiments, PLD 103 may include rows and/or columns of circuitry or blocks of circuitry.

Figure 5:
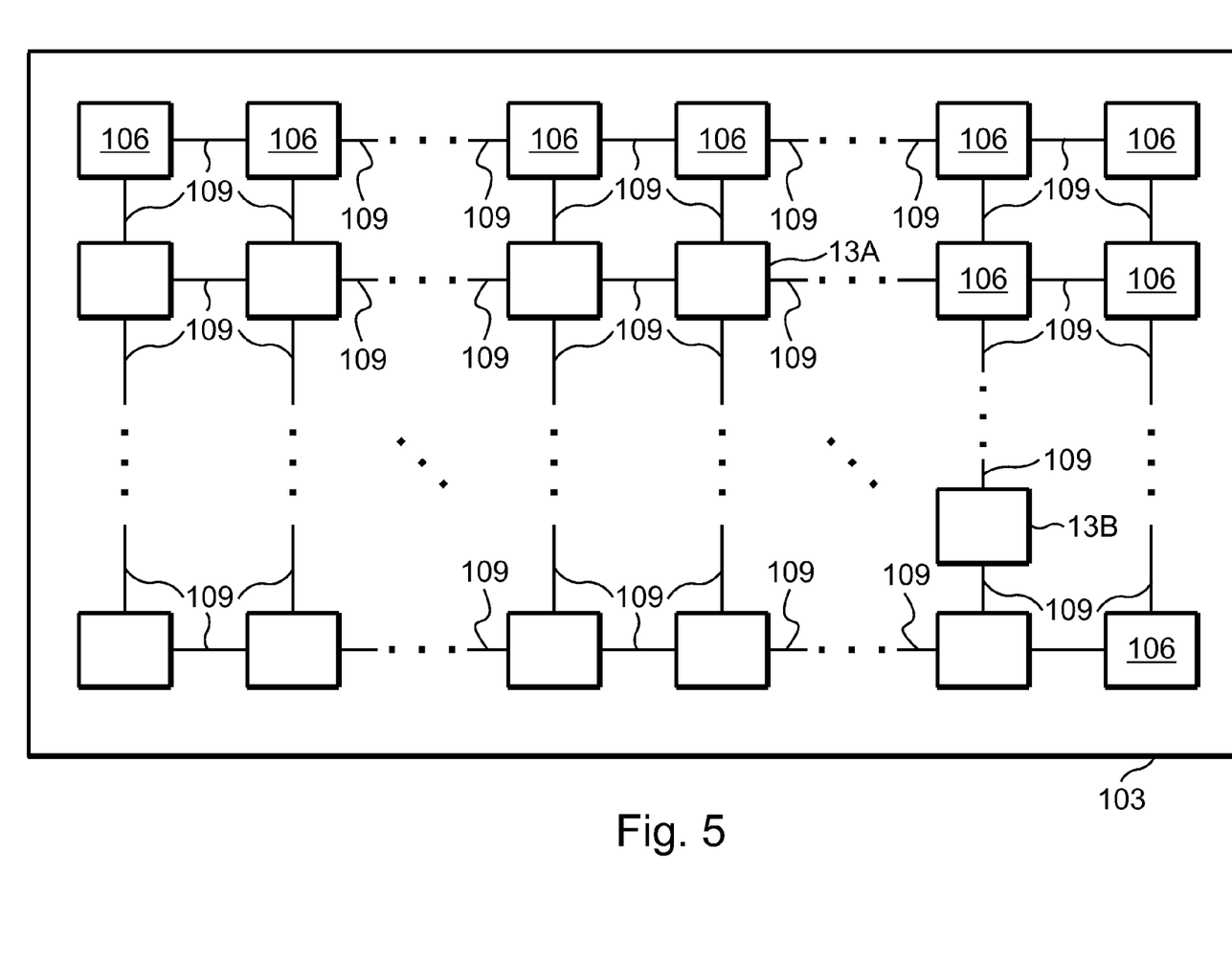
FIG. 5 depicts a block diagram of a PLD that includes programmable resources and integrated circuitry (e.g., intellectual property (IP) or hardened circuit or block) according to an exemplary embodiment.

FIG. 5 shows an example of hardened circuits 13A-13B coupling to programmable resources of PLD 103. More specifically, the figure shows a floor-plan of a PLD 103 according to an exemplary embodiment. PLD 103 includes programmable logic 106 arranged as a two-dimensional array. Programmable interconnect 109, arranged as horizontal interconnect and vertical interconnect, couples the blocks of programmable logic 106 to one another. The arrangement shown in FIG. 5 may be included in a portion or tile of PLD 103, for example, in a quadrant of PLD 103, in one or both halves of PLD 103, or in the entire fabric of PLD 103 (e.g., one tile).

Programmable logic 106 may include blocks of configurable or programmable logic circuitry, such as LUTs, product-term logic, MUXs, logic gates, registers, memory, and the like. Programmable interconnect 109 couples to programmable logic 106 and provides configurable interconnects (coupling mechanisms) between various blocks within programmable logic 106 and other circuitry within or outside PLD 103. Programmable interconnect 109 may include MUXs, pass transistors, buffers, and the like, as persons of ordinary skill in the art understand.

In addition to programmable logic 106 and programmable interconnect 109, PLD 103 includes two hardened circuits 13A-13B, although other numbers of hardened circuits may be used. Hardened circuits 13A-13B couple to programmable interconnect 109 and, hence, to one or more of programmable logic 106, depending on factors such as the architecture or fabric of PLD 103, the programming of PLD 103, etc.

Figure 6:
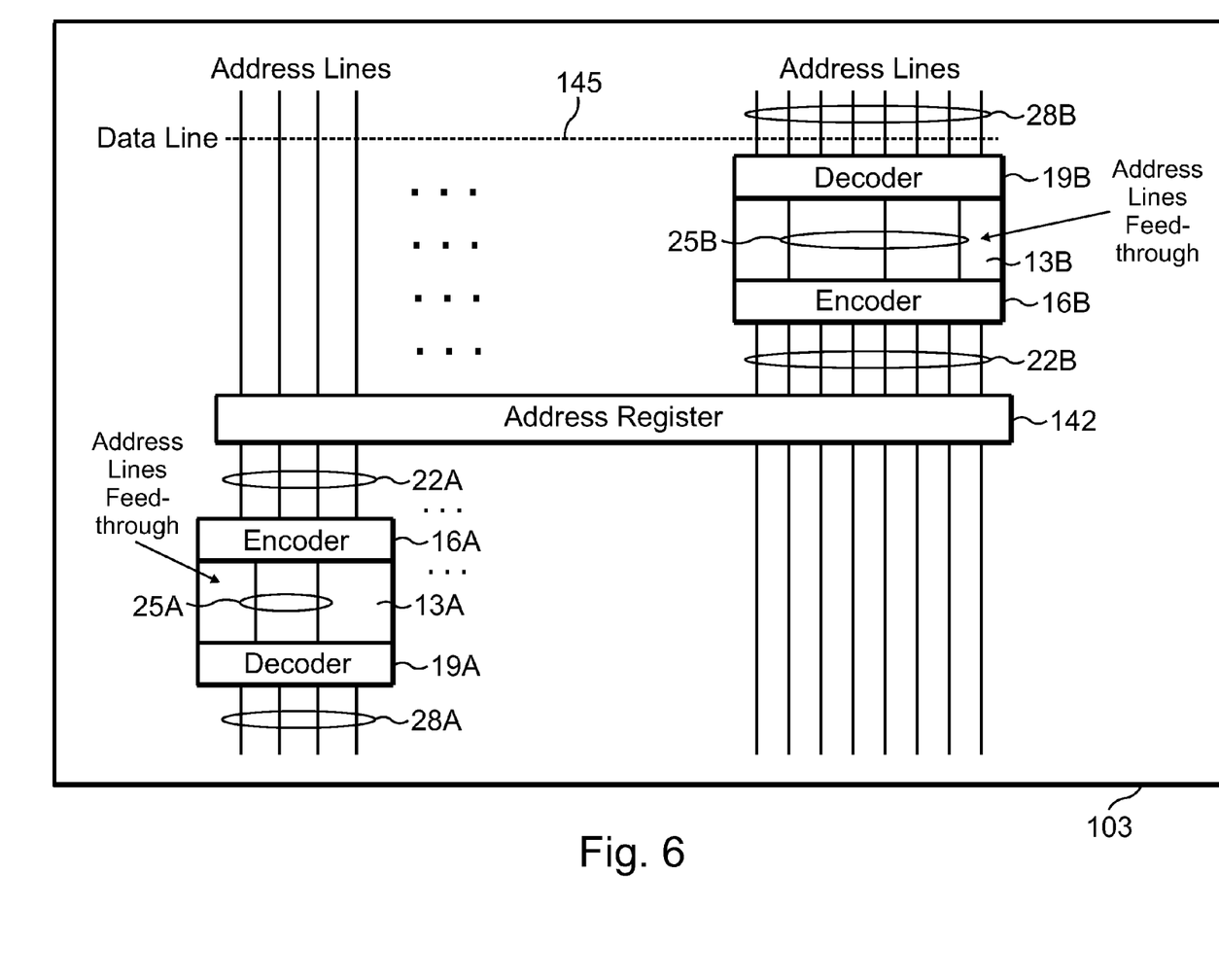
FIG. 6 shows a circuit arrangement for routing address lines in a PLD according to an exemplary embodiment.

Regardless of the exact arrangement of hardened circuits 13A-13B in a particular implementation, address encoding and decoding may be used to reduce routing congestion in PLD 103. FIG. 6 shows an example of using address encoding and decoding.

Specifically, PLD 103 includes hardened circuits 13A-13B, positioned in the floorplan of PLD 103. Encoder 16A and decoder 19A are used in conjunction with hardened circuit 13A. Address lines 22A feed inputs of encoder 16A, which provides encoded address lines 25A at its outputs. Encoded address lines 25A are routed using interconnects fabricated above (or below) hardened circuit 13A, for example, using a metal layer (or more than one metal layer, as noted above) employed in the fabrication of PLD 103. Decoder 19A receives encoded address lines 25A, and decodes them to provide address lines 28A.

Similarly, address lines 22B feed inputs of encoder 16B, which provides encoded address lines 25B at its outputs. Encoded address lines 25B are routed using interconnects fabricated above (or below) hardened circuit 13B, for example, by using a metal layer (or more than one metal layer, as noted above) employed in the fabrication of PLD 103. Decoder 19B receives encoded address lines 25B, and decodes them to provide address lines 28B.

Address register 142 may be used to buffer or hold address lines 22B or 22A, as desired. Depending on the physical size of the die of PLD 103, physical dimensions of the address lines, such as address lines 22A and 22B, may be relatively large. Using address register 142 may help to avoid signal degradation in relatively long address lines.

Address lines 22A-22B may be coupled to CRAM 133 (not shown). CRAM 133 (see FIG. 4) may use address lines 22A-22B to program the functionality of at least some of the programmable resources of PLD 103, such as programmable logic 106 (not shown; see FIGS. 4-5) and programmable interconnect 109 (not shown; see FIGS. 4-5). Similarly, data lines 145 may be used by CRAM 133 (not shown) or other circuitry in PLD 103 to provide data signals, for example, data that determine or program the functionality of the programmable resources of PLD 103.

By using encoders 16A-16B and corresponding decoders 19A-19B, interconnect congestion in PLD 103 may be reduced. For example, as described above, congestion in the interconnect used to couple hardened circuit 13A to other circuitry in PLD 103 and/or congestion in other interconnect and/or in one or more metal layers of PLD 103 may be reduced. Also, resistive voltage drops and the corresponding loss of signal quality and increased power consumption in the hardened circuits may be reduced or prevented.

To facilitate the use of the address encoding and decoding techniques in PLDs, and to aid the PLD's user in implementing or realizing circuitry or systems using the resources of the PLD (including the address encoding and decoding hardware and associated programming), one may use a computer-aided design (CAD) flow or software.

Figure 7:
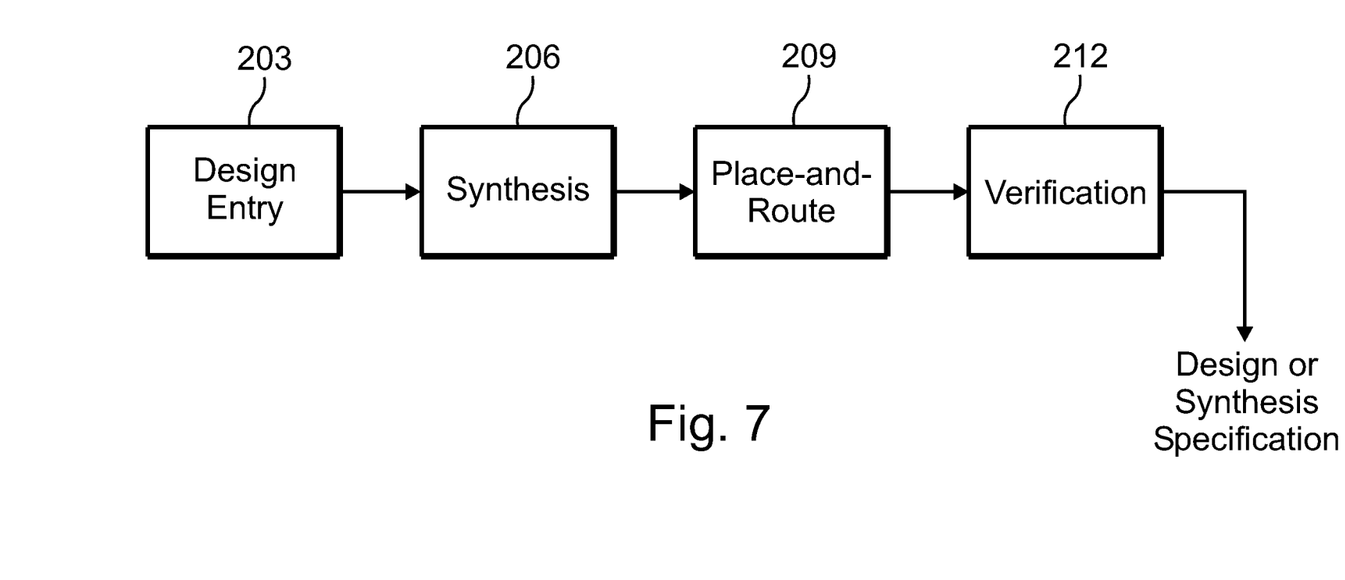
FIG. 7 illustrates a block diagram of various modules of a PLD computer-aided design (CAD) software or flow according to an exemplary embodiment.

FIG. 7 illustrates various software modules that PLD CAD software or flow according to an exemplary embodiments uses. The modules include design-entry module 203, synthesis module 206, place-and-route module 209, and verification module 212. The CAD flow may have a variety of applications and provide various functionality. Examples include design area optimization or planning, placement, timing performance and closure, power planning, routability optimization or planning, etc.

Design-entry module 203 allows the editing of various design description files using graphical or textual descriptions of a circuit or its behavior, such as schematics, hardware description languages (HDL), or waveforms, as desired. The user may generate the design files by using design-entry module 203 or by using a variety of electronic design automation (EDA) or CAD tools (such as industry-standard EDA tools), as desired. The user may enter the design in a graphic format, a waveform-based format, a schematic format, in a text or binary format, or as a combination of those formats, as desired.

The user may specify one or more hardened circuits 13 as part of the specification of the overall PLD. The hardened circuits 13 may be used in implementing or realizing the user's circuit, and may couple to other circuitry in PLD 103, as described above. The user may provide a variety of specifications for various aspects of the design. Examples include location (placement specifications), power specifications, timing specifications, functionality, etc.

Synthesis module 206 accepts the output of design-entry module 203. Based on the user-provided design, synthesis module 206 generates appropriate logic circuitry that realizes the user-provided design. One or more PLDs (not shown explicitly), such as PLD 103 in FIG. 1, implement the synthesized overall design or system.

Synthesis module 206 may also generate any glue logic that allows integration and proper operation and interfacing of various modules in the user's designs. For example, synthesis module 206 provides appropriate hardware so that an output of one block properly interfaces with an input of another block. Synthesis module 206 may provide appropriate hardware so as to meet the specifications of each of the modules in the overall design or system.

Synthesis module 206 may also provide appropriate encoders and decoders to implement the address encoding and decoding scheme described above. By specifying an encoder and decoder for one or more hardened circuits, synthesis module 206 may facilitate improved routing in PLD 103, and lessen routing congestion, as described above. Furthermore, synthesis module 206 may do so in a manner that is transparent to the user of PLD 103, for example, by automatically inserting encoders and decoders when the user has specified hardened circuits in his/her design. Synthesis module 206 may also provide location information for the encoders and decoder to aid proper placement by place-and-route module 209, described below.

Furthermore, synthesis module 206 may include algorithms and routines for optimizing the synthesized design. Through optimization, synthesis module 206 seeks to more efficiently use the resources of the one or more PLDs that implement the overall design or system. Synthesis module 206 provides its output to place-and-route module 209. Following synthesis, one may include a technology mapping module (not shown explicitly).

Place-and-route module 209 uses the designer's timing specifications to perform optimal logic mapping and placement in the floorplan of PLD 103. The logic mapping and placement determine the use of logic resources within the PLD(s). By the use of particular programmable interconnects with the PLD(s) for certain parts of the design, place-and-route module 209 helps optimize the performance of the overall design or system. By the proper use of PLD routing resources, place-and-route module 209 helps to meet the critical timing paths of the overall design or system. As noted above, encoders and decoders may have pre-determined, pre-assigned, reserved, or allocated locations in the floorplan of PLD 103. Place-and-route module 209 uses information about such locations to properly route components or circuitry in PLD 103 and, hence, to improve routing congestion of PLD 103 or avoid or reduce routing congestion in PLD 103.

Place-and-route module 209 optimizes the critical timing paths to help provide timing closure faster, as persons of ordinary skill in the art understand. As a result, the overall design or system can achieve faster performance (i.e., operate at a higher clock rate or have higher throughput).

Verification module 212 performs simulation and verification of the design. The simulation and verification seek in part to verify that the design complies with the user's prescribed specifications. The simulation and verification also aim at detecting and correcting any design problems before prototyping the design. Thus, verification module 212 helps the user to reduce the overall cost and time-to-market of the overall design or system.

Verification module 212 may support and perform a variety of verification and simulation options, as desired. The options may include functional verification, test-bench generation, static timing analysis, timing simulation, hardware/software simulation, in-system verification, board-level timing analysis, signal integrity analysis and electro-magnetic compatibility (EMC), formal netlist verification, and the like, as persons of ordinary skill in the art who have the benefit of the description of this disclosure understand.

Note that one may perform other or additional verification techniques as desired and as persons of ordinary skill in the art who have the benefit of this disclosure understand. Verification of the design may also be performed at other phases in the flow, as appropriate, and as desired.

As noted above, although the above description relates in part the application of the disclosed concepts to PLDs, one may apply the disclosed concepts to a variety of other electronic circuits and devices, by making modifications that fall within the knowledge of persons of ordinary skill in the art. Some examples of such devices include custom, standardcell, gate-array, field-programmable gate arrays (FPGAs), complex PLDs (CPLDs), and structured ASIC implementations.

Figure 8:
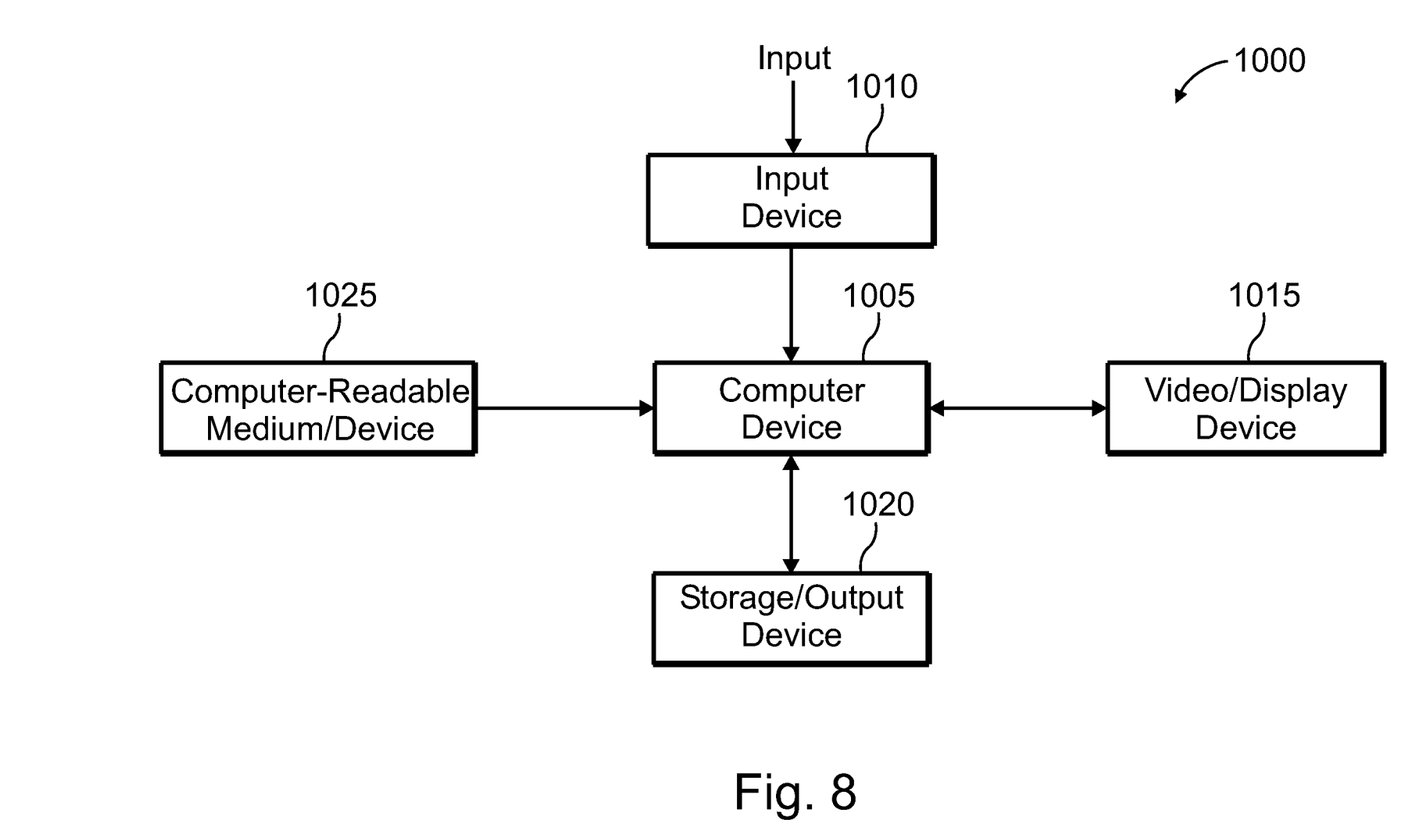
FIG. 8 depicts a block diagram of a system for processing information, such as a CAD flow, according to an exemplary embodiment.

One may run or execute the disclosed algorithms, methods, software (e.g., CAD software), or firmware (e.g., where part of the functionality of some circuitry, such as body bias control circuitry, is implemented using firmware) on computer systems or processors. Specifically, the PLD CAD flow (see, for example, FIG. 7) may be implemented as software that runs on an information processing system or computer, such as the information processing system shown in FIG. 8. Persons of ordinary skill in the art understand that one may use a wide variety of other information processing apparatus, computer systems, processors, microcomputers, workstations, and the like, as desired. Thus, FIG. 8 illustrates merely one example.

System 1000 includes a computer device 1005, an input device 1010, a video/display device 1015, and a storage/output device 1020, although one may include more than one of each of those devices, as desired. Computer device 1005 couples to input device 1010, video/display device 1015, and storage/output device 1020. System 1000 may include more that one computer device 1005, for example, a set of associated computer devices or systems, as desired, and as persons of ordinary skill in the art understand.

System 1000 operates in association with input from a user. The user input typically causes system 1000 to perform specific desired information-processing tasks, including circuit simulation. System 1000 in part uses computer device 1005 to perform those tasks. Computer device 1005 includes an information-processing circuitry, such as a central-processing unit (CPU), although one may use more than one CPU or information-processing circuitry, as persons skilled in the art would understand.

Input device 1010 receives input from the user and makes that input available to computer device 1005 for processing. The user input may include data, instructions, or both, as desired. Input device 1010 may constitute an alphanumeric input device (e.g., a keyboard), a pointing device (e.g., a mouse, roller-ball, light pen, touch-sensitive apparatus, for example, a touch-sensitive display, or tablet), or both. The user operates the alphanumeric keyboard to provide text, such as ASCII characters, to computer device 1005. Similarly, the user operates the pointing device to provide cursor position or control information to computer device 1005.

Video/display device 1015 displays visual images or graphics to the user. The visual images may include information about the operation of computer device 1005, such as graphs, pictures, images, and text. The video/display device may constitute a computer monitor or display, a projection device, and the like, as persons of ordinary skill in the art would understand. If a system uses a touch-sensitive display or touchscreen, the display may also operate to provide user input to computer device 1005.

Storage/output device 1020 allows computer device 1005 to store information for additional processing or later retrieval (e.g., softcopy), to present information in various forms (e.g., hardcopy), or both. As an example, storage/output device 1020 may constitute a magnetic, optical, or magneto-optical drive capable of storing information on a desired medium and in a desired format. As another example, storage/output device 1020 may constitute a printer, plotter, or other output device to generate printed or plotted expressions of the information from the computer device 1005.

Computer-readable medium 1025 interrelates structurally and functionally to computer device 1005. Computer-readable medium 1025 stores, encodes, records, and/or embodies functional descriptive material. By way of illustration, the functional descriptive material may include computer programs, computer code, computer applications, and/or information structures (e.g., data structures or file systems). When stored, encoded, recorded, and/or embodied by computer-readable medium 1025, the functional descriptive material imparts functionality. The functional descriptive material interrelates to computer-readable medium 1025.

Information structures within the functional descriptive material define structural and functional interrelations between the information structures and computer-readable medium 1025 and/or other aspects of system 1000. These interrelations permit the realization of the information structures' functionality. Moreover, within such functional descriptive material, computer programs define structural and functional interrelations between the computer programs and computer-readable medium 1025 and other aspects of system 1000. These interrelations permit the realization of the computer programs' functionality.

By way of illustration, computer device 1005 reads, accesses, or copies functional descriptive material into a computer memory (not shown explicitly in the figure) of computer device 1005. Computer device 1005 performs operations in response to the material present in the computer memory. Computer device 1005 may perform the operations of processing a computer application that causes computer device 1005 to perform additional operations. Accordingly, the functional descriptive material exhibits a functional interrelation with the way computer device 1005 executes processes and performs operations.

Furthermore, computer-readable medium 1025 constitutes an apparatus from which computer device 1005 may access computer information, programs, code, and/or applications. Computer device 1005 may process the information, programs, code, and/or applications that cause computer device 1005 to perform additional operations.

Note that one may implement computer-readable medium 1025 in a variety of ways, as persons of ordinary skill in the art would understand. For example, memory within computer device 1005 may constitute a computer-readable medium 1025, as desired. Alternatively, computer-readable medium 1025 may include a set of associated, interrelated, coupled (e.g., through conductors, fibers, etc.), or networked computer-readable media, for example, when computer device 1005 receives the functional descriptive material from a network of computer devices or information-processing systems. Note that computer device 1005 may receive the functional descriptive material from computer-readable medium 1025, the network, or both, as desired.

Referring to the figures, persons of ordinary skill in the art will note that the various blocks shown might depict mainly the conceptual functions and signal flow. The actual circuit implementation might or might not contain separately identifiable hardware for the various functional blocks and might or might not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts, and is to be construed as illustrative only.

The forms and embodiments shown and described should be taken as illustrative embodiments. Persons skilled in the art may make various changes in the shape, size and arrangement of parts without departing from the scope of the disclosed concepts in this document. For example, persons skilled in the art may substitute equivalent elements for the elements illustrated and described here. Moreover, persons skilled in the art may use certain features of the disclosed concepts independently of the use of other features, without departing from the scope of the disclosed concepts.

The invention claimed is:

1. An integrated circuit (IC) comprising:
    a circuit, coupled to circuitry in the IC via a first set of interconnect fabricated using a metal layer;
    an encoder to encode a plurality of address lines to provide a plurality of encoded address lines; and
    a decoder to decode the plurality of encoded address lines, wherein the plurality of encoded address lines are routed using a second set of interconnect fabricated using the metal layer.

2. The integrated circuit (IC) according to claim 1, wherein routing the plurality of encoded address lines instead of the plurality of address lines reduces routing congestion in the metal layer.

3. The integrated circuit (IC) according to claim 1, wherein routing the plurality of encoded address lines instead of the plurality of address lines reduces routing congestion in the first set of interconnect.

4. The integrated circuit (IC) according to claim 1, wherein the second set of interconnect are routed above the circuit.

5. The integrated circuit (IC) according to claim 4, wherein the circuit comprises an intellectual property (IP) block.

6. The integrated circuit (IC) according to claim 1, wherein the encoder is adapted to encode the plurality of address lines using a gray code.

7. The integrated circuit (IC) according to claim 6, wherein the decoder comprises a gray code decoder.

8. A programmable logic device (PLD), comprising:
    a circuit implemented using programmable resources of the PLD;
    an encoder to encode a plurality of address lines to provide a plurality of encoded address lines, the plurality of encoded address lines being routed using a first set of interconnect fabricated above the circuit; and
    a decoder to decode the plurality of encoded address lines.

9. The programmable logic device (PLD) according to claim 8, wherein the circuit is coupled to programmable resources of the PLD via a second set of interconnect.

10. The programmable logic device (PLD) according to claim 9, wherein the first and second sets of interconnect are fabricated using a metal layer.

11. The programmable logic device (PLD) according to claim 8, wherein the plurality of address lines are coupled to a configuration memory.

12. The programmable logic device (PLD) according to claim 8, wherein the programmable resources of the PLD comprise programmable interconnect.

13. The programmable logic device (PLD) according to claim 8, wherein the programmable resources of the PLD comprise programmable logic.

14. The programmable logic device (PLD) according to claim 8, wherein the encoder is adapted to encode the plurality of address lines using a gray code.

15. The programmable logic device (PLD) according to claim 8, wherein the decoder comprises a gray code decoder.

16. A method of improving interconnect routing in an integrated circuit (IC), the method comprising:
    encoding a plurality of address lines to produce a plurality of encoded address lines; and
    routing the plurality of encoded address lines via a first set of interconnects fabricated in the IC,
    wherein a circuit is coupled to other circuitry in the IC via a second set of interconnects fabricated in the IC, and wherein routing the plurality of encoded address lines via the first set of interconnects reduces routing congestion in the IC.

17. The method according to claim 16, further comprising decoding the plurality of address lines.

18. The method according to claim 16, wherein routing the plurality of encoded address lines via the first set of interconnects reduces routing congestion in the metal layer.

19. The method according to claim 18, wherein the circuit comprises an intellectual property (IP) block.

20. The integrated circuit (IC) according to claim 18, wherein the encoder is adapted to encode the plurality of address lines using a gray code, and wherein the decoder comprises a gray code decoder.

* * * * *